US012395780B2

(12) United States Patent
Ovalle

(10) Patent No.: US 12,395,780 B2
(45) Date of Patent: Aug. 19, 2025

(54) HEADPHONE USING PASSIVE FILTER

(71) Applicant: Juan A. Ovalle, Long Beach, CA (US)

(72) Inventor: Juan A. Ovalle, Long Beach, CA (US)

( * ) Notice: Subject to any disclaimer, the term of this patent is extended or adjusted under 35 U.S.C. 154(b) by 320 days.

(21) Appl. No.: 17/992,633

(22) Filed: Nov. 22, 2022

(65) Prior Publication Data

US 2024/0171898 A1 May 23, 2024

(51) Int. Cl.
*H04R 1/24* (2006.01)
*H04R 1/28* (2006.01)

(52) U.S. Cl.
CPC ................. *H04R 1/24* (2013.01); *H04R 1/28* (2013.01)

(58) Field of Classification Search
CPC .................................... H04R 1/24; H04R 1/28
See application file for complete search history.

(56) References Cited

U.S. PATENT DOCUMENTS 10,340,872 B1 * 7/2019 Masek ................... H04B 15/02
2015/0016634 A1 * 1/2015 Powell ..................... H03H 7/20 381/120
2015/0023515 A1 * 1/2015 Reimert ............... H04R 1/1083 381/71.6
2015/0312693 A1 * 10/2015 Collins .................... H04R 3/14 381/300
2016/0057525 A1 * 2/2016 Kappus ................ H04R 1/1075 381/74
2017/0064434 A1 * 3/2017 Campbell ............ H04R 1/1091
2018/0041828 A1 * 2/2018 Sibbald ............ G10K 11/17873
2019/0281375 A1 * 9/2019 Gordeyev ............ H04R 29/001

* cited by examiner

*Primary Examiner* — Fan S Tsang
*Assistant Examiner* — Tyler Michael Liebgott
(74) *Attorney, Agent, or Firm* — Fulwider Patton LLP

(57) ABSTRACT

A headphone set includes a novel passive filter for processing an audio signal. The filter circuit uses three major sections. A parallel resistor and capacitor in series with the speaker, a series capacitor and resistor in parallel with the speaker, and a series inductor and capacitor in parallel with the speaker, with values changing relative to the combined impedance of the first two sections. The first section serves as a controlled high pass filter and the second section serves as a controlled low pass filter. The third section reduces overall impedance in order to reduce differences between the lowest and highest impedance on the spectrum established by the first two sections in order to maintain a consistent response across amplifiers which would otherwise have a more drastic effect on the filter values due to highly variable impedance being affected by an amplifiers output load.

7 Claims, 3 Drawing Sheets

FIG. 1
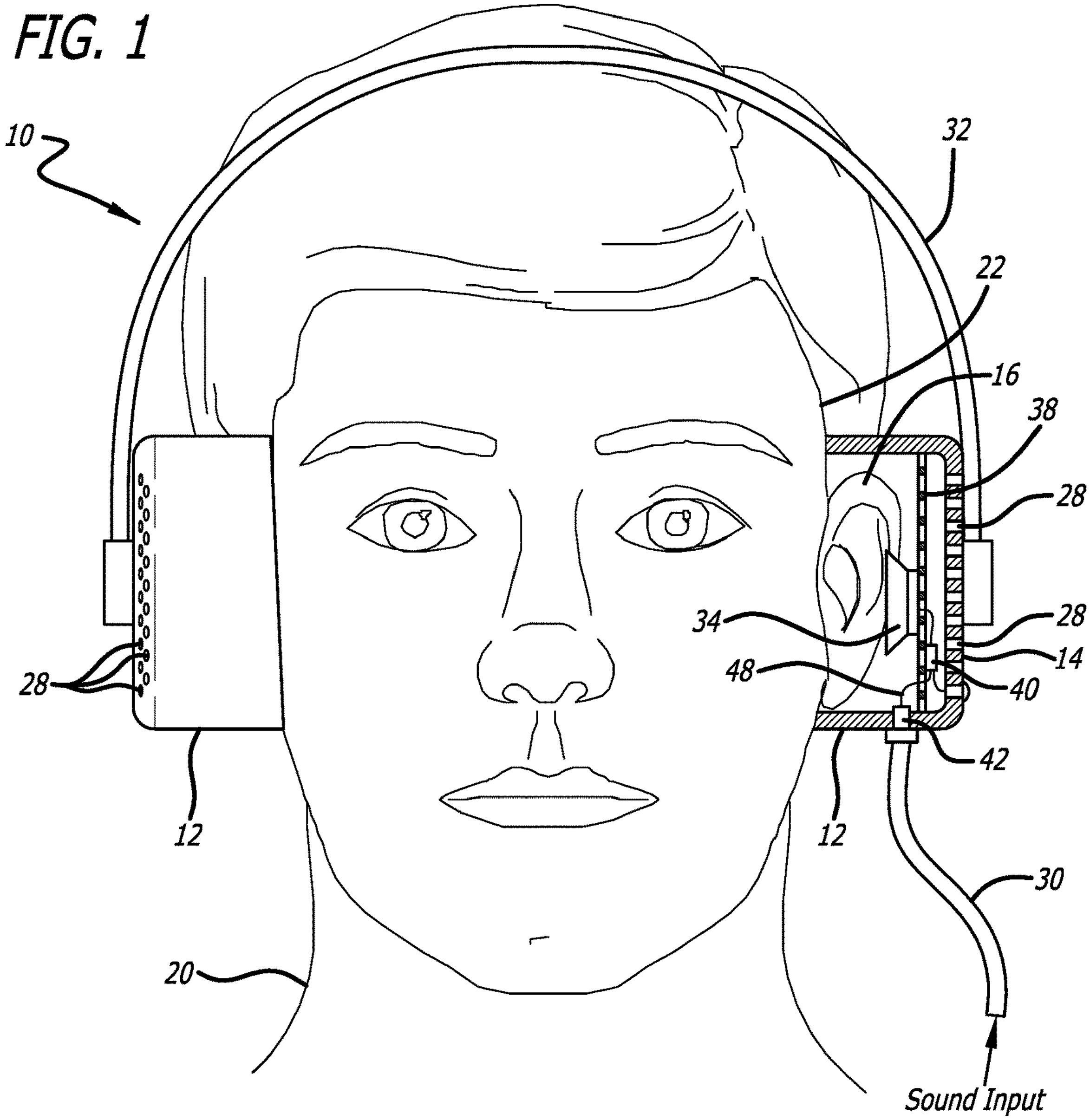
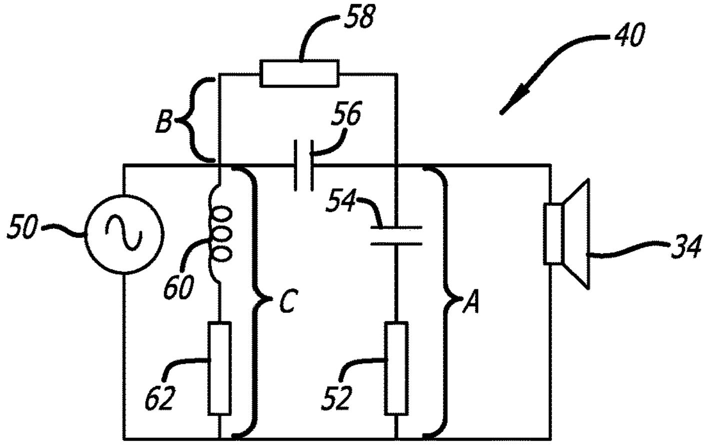
FIG. 2

HEADPHONE USING PASSIVE FILTER

BACKGROUND

The present invention is related to audio headphones, and more particularly to a set of audio headphones with a unique passive filter that is integrated into an open-back studio type monitoring headphone to improve the performance of the headphone.

Sealed or closed-back headphones have an inconsistent low frequency response (bass) in practice (due to uncontrolled leakage on human heads), despite improved response in lab (sealed) conditions. An open-type headphone has vents or grills instead of a closed off earcup to allow the free passage of air around the dynamic, electrostatic, or planar drivers. Open headphones let air to pass through the ear cups from the front and rear of the speaker driver, which tends to alleviate the resonances and low-frequency build-up caused by a rear enclosure, and produces a sound that many believe is more natural and clear. One drawback of open-back headphones, however, is that linear low and high frequency extension (20 hz, 20 khz) may be compromised due to leakage of the sound out of the vented openings. A high frequency extension (treble) compensation is often required as well due to the high damping factor of certain headphones, which sacrifice extension in high frequencies for accurate and smooth response, therefore requiring correction via external factors to prevent loss in audible clarity.

To overcome this drawback, some wireless closed-back headphones include an active digital circuit and microphones to compensate for the high variance caused by leakage. Digital circuits may also compensate for high frequency response, using external power and software. High displacement speaker units may also be used to compensate for leakage and high frequency response, however other issues are present.

Active filter circuits require external power for the microphone and the accompanying digital electronics for low frequency compensation, and these configurations tend to not be cost effective at small scale due to component and implementation costs. Furthermore, this may not be ideal where extremely long use times are the norms, such as the case in studio environments where all equipment must be available at all times, and work accurately regardless of conditions. High displacement speakers may (through the use of larger diaphragms) be impractical to package into headphones due to size or cost, and introduce audible resonance modes in high frequencies that produce nonlinear peaks or dips in the response which can negatively affect sound quality and therefore accuracy to the recording being reproduced.

Currently there is no adequate solution to the problem of leakage losses in conventional open headphones that is cost effective and improves performance, without causing unwanted resonances. The invention overcomes the shortcomings of the active or powered circuit by employing a passive compensation filter in a headphone, where the filter requires no active circuits that requires external power and relies only on a standard audio output signal voltage to compensate for losses in low frequency extension. The filter of the present invention increases clarity in high frequencies boosting below 200 Hz and above 5 khz.

SUMMARY OF THE INVENTION

The present invention is a headphone having an open or vented back configuration and includes a passive filter to process the audio signal prior to the speaker. The filter is a circuit board having three main paths. A first path comprises a parallel resistor and capacitor in series with the speaker, with a capacitor range between 0.1 and 5 uF, coupled to a resistor above 5 Ohms of impedance. A second path comprises a series capacitor and resistor in parallel with the speaker, with a capacitor in the range between 90 uF and 1000 uF, coupled to a resistor between 1 and 30 Ohms. The third path has a series inductor and capacitor in parallel with the speaker, with values that change relative to the combined impedance of the first two paths.

The first path serves as a controlled low pass filter, boosting below 200 hz linearly to 20 hz to compensate for low frequency loss. The second path serves as a controlled high pass filter that effectively boosts a curve linearly to 20 khz starting at 5 khz. Either of these may have values and slope curves controlled in order to compensate for different requirements in extension compensation. The third path reduces the overall impedance in order to reduce differences between the lowest and highest impedance on the 20-20 khz spectrum caused by the two previously mentioned paths in order to maintain a consistent response across amplifiers that would otherwise have a more drastic effect on the values due to highly variable impedance being affected by an amplifier's output load. Note that the third path does not contribute directly to the compensation function, but rather ensures the filter's capacity to function within specifications in non ideal electrical conditions.

These and other features of the invention will best be understood in contemplation of the included figures listed below and the detailed description of the invention.

BRIEF DESCRIPTION OF THE DRAWINGS

FIG. 1 is a front view, partially in section, of a headphone set of the present invention;

FIG. 2 is a schematic diagram of a first embodiment of a circuit board serving as the passive filter that is incorporated into the headphone set;

DETAILED DESCRIPTION OF THE PREFERRED EMBODIMENTS

Figure 3:
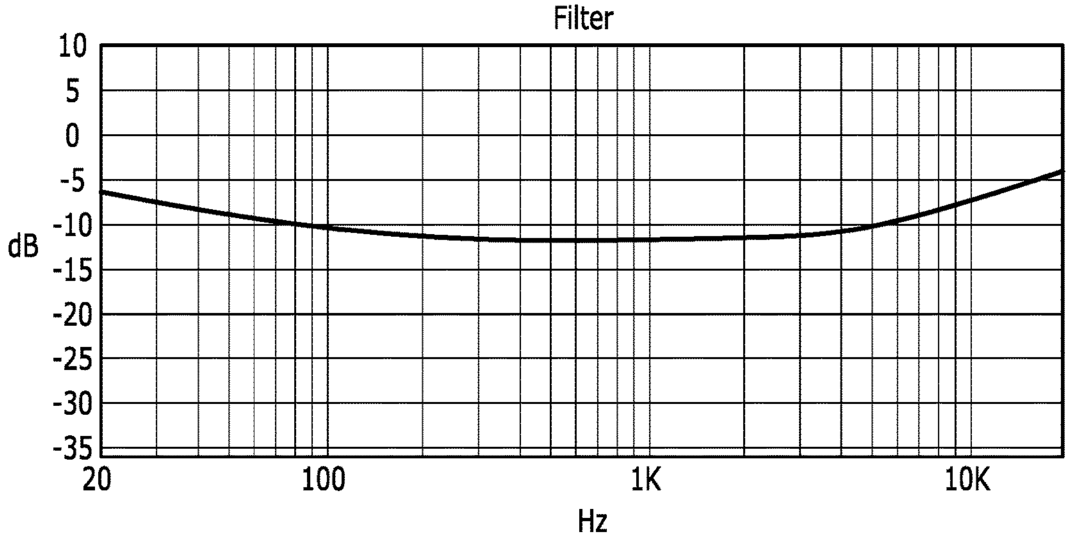
FIG. 3 is a signal versus frequency graph for a filter of the present invention.

FIG. 1 depicts a set of headphones 10 of the type embodying the present invention. It should be noted that FIG. 1 is intended to be illustrative in nature and that the shape and dimension of the headphones will differ from that shown in FIG. 1. The headphones 10 are shown with first and second ear cups 12 that are designed to fit over the ear 16 of a user 20. The ear cups 12 typically have a cushioned or foam edge (not depicted) that bears against the user's temple 22 and forms a snug fit with the user over the ear 16. In the headphones of the invention, the outer wall 14 of the ear cups 12 are open or vented so that air can flow into the ear cup through the outer wall 14 and sound and air can escape the volume defined by the ear cup 12. The number and shape of the vents 28 play no role in the invention, but the invention is particularly suited to headphones having these vents/opening. A cable 30 is provided for transmitting an input audio signal to the ear cup 12, and a wire (not shown) carried by the flexible connector 32 feeds the processed audio signal to the other ear cup where it is transmitted through the speaker in that ear cup. Each ear cup 12 includes a speaker 34 that drives the air inside the ear cup 12 to produce the sound from the audio signal. There is no power source within the headphones other than the audio signal transmitted through the cable 30. Also, it is understood that the audio signal can be transmitted in other ways, such as wirelessly, and the manner in which the signal is transmitted plays no role in the present invention.

The ear cup 12 may include a plate 38 that is also vented with openings to allow air and sound to flow through the plate 38. The plate 38 is adjacent a jack 42 where the audio signal enters the headphones, and the plate may mount the speaker 34 or have a central opening that allows the speaker to vibrate unhindered by the plate 38. On the plate is a circuit board connected by a wire 48 to the audio signal jack 42 and the circuit board operates as a passive filter 40 for processing the audio signal before sending the signal to the speakers 34. The passive filter 40 is well suited for a portable device such as a set of headphones and its passive (i.e., no external power supply) characteristic make it both efficient and economical. By eliminating the necessity for power to the filter 40 and using only the voltage from the input audio signal, the filter 40 of the present invention is lightweight, robust, and cost efficient while delivering outstanding performance in an open-back headphone set.

The filter 40 is shown as a schematic in FIG. 2, where the audio input signal is represented by voltage 50 and the speaker is represented by element 34. One can easily see that the circuit board has three paths for current to move through the circuit, labeled A, B, and C. Path A comprises a resistor 52 and a capacitor 54 in series, and the path A is in parallel with the speaker 34 and the voltage source 50. In the filter of the present invention, the capacitor 54 has a preferred range between 90 μF and 1000 μF, and the resistor 52 between on Ohm and 30 Ohms. The path serves as a controlled low pass filter that boosts the signal below 100 hz linearly to 20 hz to compensate for low frequency loss. Path B comprises a capacitor 56 and a resistor 58 in parallel, the entire path in series with the input voltage source 50 and the speaker 34. In the filter of the present invention, the capacitor 56 has a capacitance in the range of 0.1 μF and 5 μF, and the resistor 58 has an impedance of at least five Ohms. Path B serves as a controlled high pass filter that boosts the signal from 5 Khz linearly to 20 Khz to compensate for high frequency loss.

Path C comprises an inductor 60 and a resistor 62 in series, the path C in parallel with the voltage source 50 and the speaker 34. The values of the capacitance and inductance of the capacitor 62 and inductor 60, respectively, will vary depending upon the combined impedance of paths A and B. An example of the value of the impedance of capacitor 62 is 56 Ohms and an example of the value of the impedance of the inductor 60 is 16 Ohms with an impedance of 1 mH. Path C is a sub-filter that reduces an overall impedance of the filter 40 in order to reduce a difference between the lowest and highest impedance on the 20 Hz-20 Khz spectrum resulting from paths A and B. Path C is intended to normalize or modulate a response across amplifiers that would otherwise have a more drastic effect on the filter values due to highly variable impedance being affected by amplifier's' output load.

Figure 4:
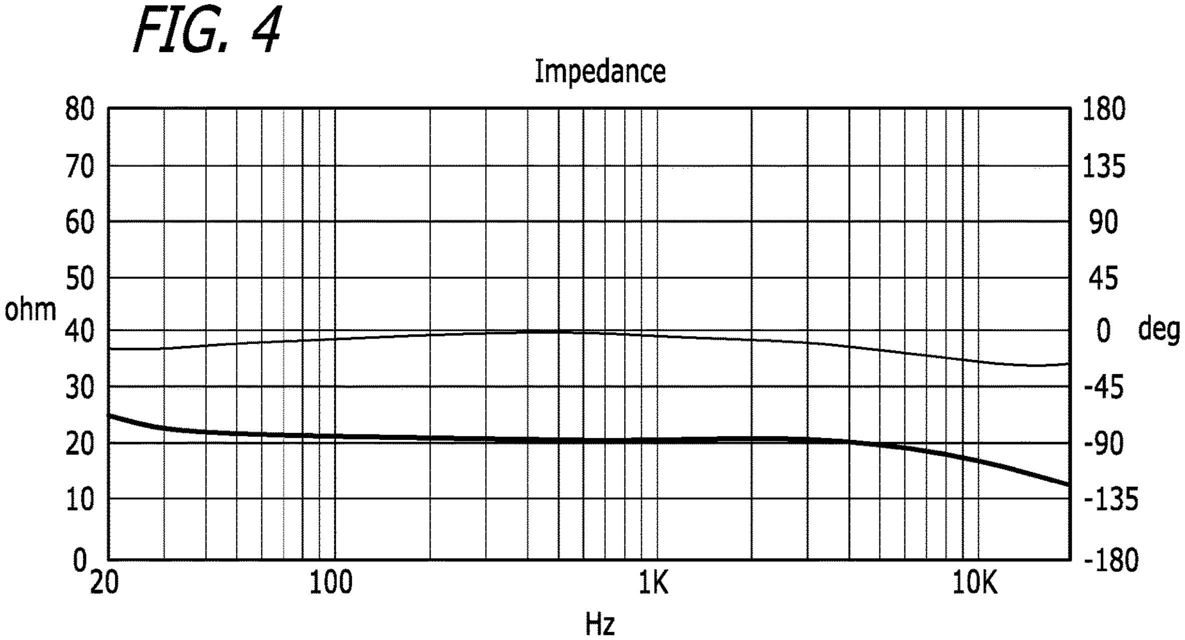
FIG. 4 is an impedance versus frequency graph for a filter of the present invention.
Figure 5:
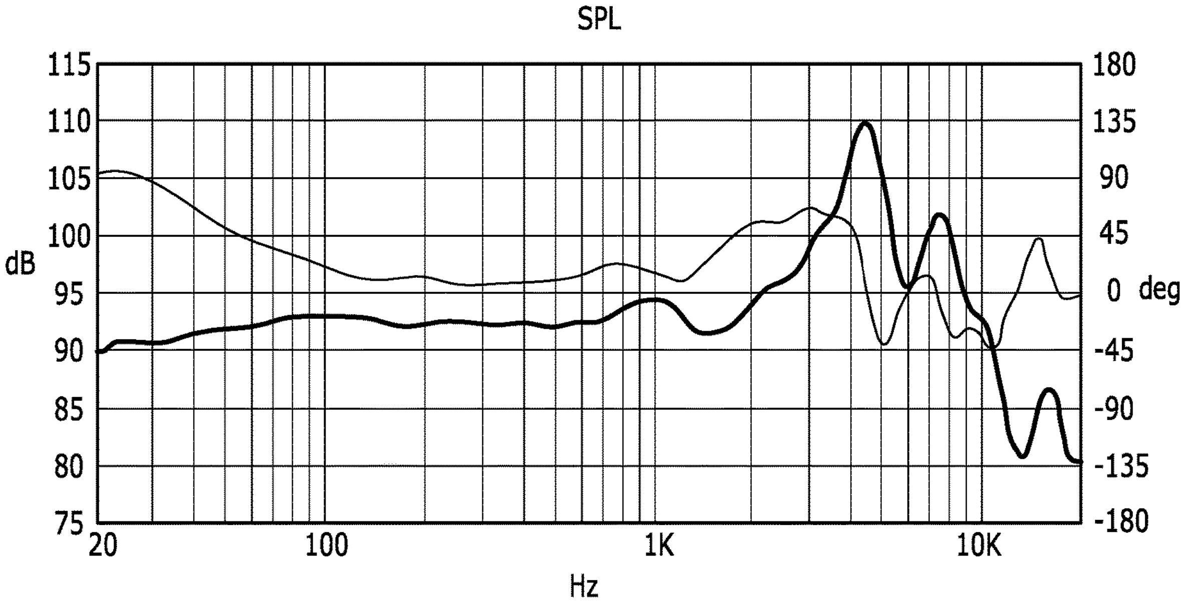
FIG. 5 is a graph of measured dB versus frequency for a headphone without compensation.
Figure 6:
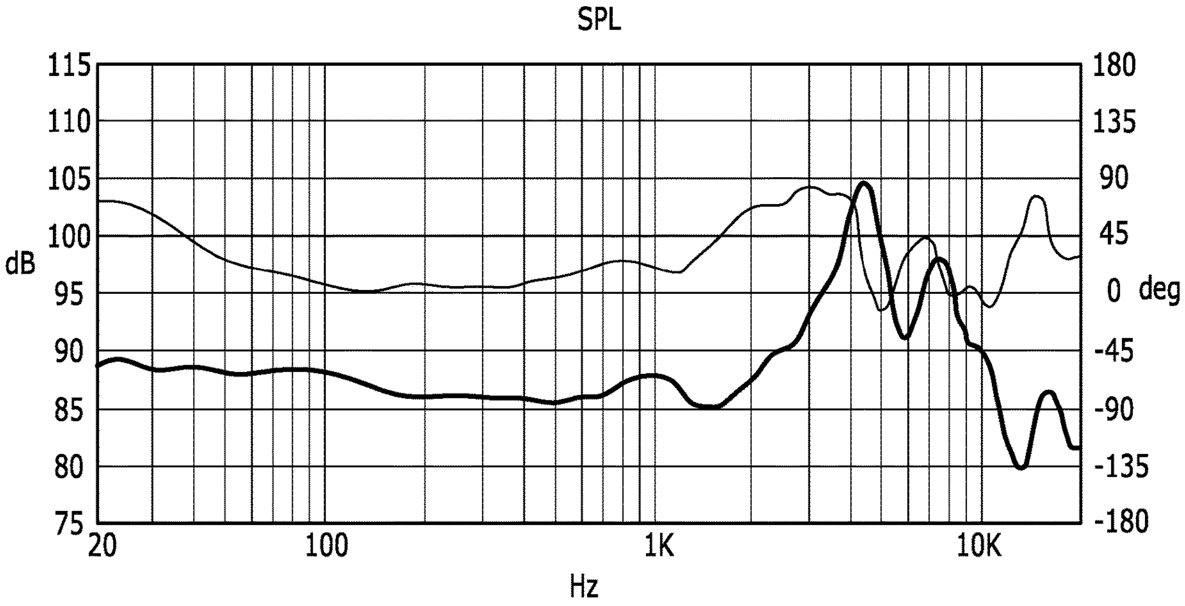
FIG. 6 is a graph of measured dB versus frequency for a headphone with compensation using the present invention.

FIG. 3, labeled "Filter," is a graph that depicts the combined smoothing effect of paths A and B on an input audio voltage in the range of between 20 Hz and 20 KHz. FIG. 4 is a graph that shows the resulting impedance curve in both Ohm versus frequency and phase versus frequency along the same frequency scale. FIGS. 5 and 6 show test measurements plotting dB versus frequency for actual headphones built according to the present invention, both before (FIG. 5) and after (FIG. 6) filtering. The lighter line in each graph corresponds to a phase response before and after filtering. One can see that FIG. 6 (post compensation) shows an improved linearity in the dB scale in the area of primary concern for audio inputs.

While the foregoing represents the inventor's best mode for operating and constructing the present invention, the invention should not be limited to any particular described or depicted aspect of the figures and descriptions, which are intended to be illustrative but not limiting. The invention can take many forms, and the values, dimensions, shapes, and arrangement of the elements should not be taken as limiting or exclusive of other values, dimensions, shapes, and arrangements. Rather, the scope of the invention is properly measured by the words of the appended claims using their ordinary meanings consistent with, but not limited by, the foregoing descriptions and depictions.

I claim:

1. A headphone, comprising:

a first earcup configured to bear against a user's head, the first earcup having an open first side, a vented opposite side having unobstructed openings, and a perforated plate disposed therebetween;

a speaker disposed inside the first earcup; and a passive filter mounted inside the earcup, the passive filter comprising a first, second, and third paths;

wherein the first path comprises a series capacitor and resistor in parallel with the speaker, the capacitor having a capacitance in a range between 90 uF and 1000 uF and the resistor having an impedance of between 1 and 30 Ohms;

wherein the second path comprises a parallel resistor and capacitor in series with the speaker, the capacitor having a capacitance in a range between 0.1 and 5 uF and the resistor having an impedance of at least five Ohms; and wherein the third path comprises a series inductor and resistor in parallel with the speaker.

2. The headphone of claim 1, wherein the passive filter is mounted on the perforated plate.

3. The headphone of claim 1, wherein the third path reduces an overall impedance such that a difference between a highest and lowest impedance resulting from the first and second paths is reduced.

4. The headphone of claim 1, further comprising a second earcup.

5. The headphone of claim 1, wherein the speaker is mounted on the perforated plate.

6. The headphone of claim 5, wherein the passive filter is mounted on the perforated plate.

7. The headphone of claim 6, wherein the perforated plate spans an interior of the first earcup in a vertical direction.

* * * * *